UNITED STATES PATENT OFFICE.

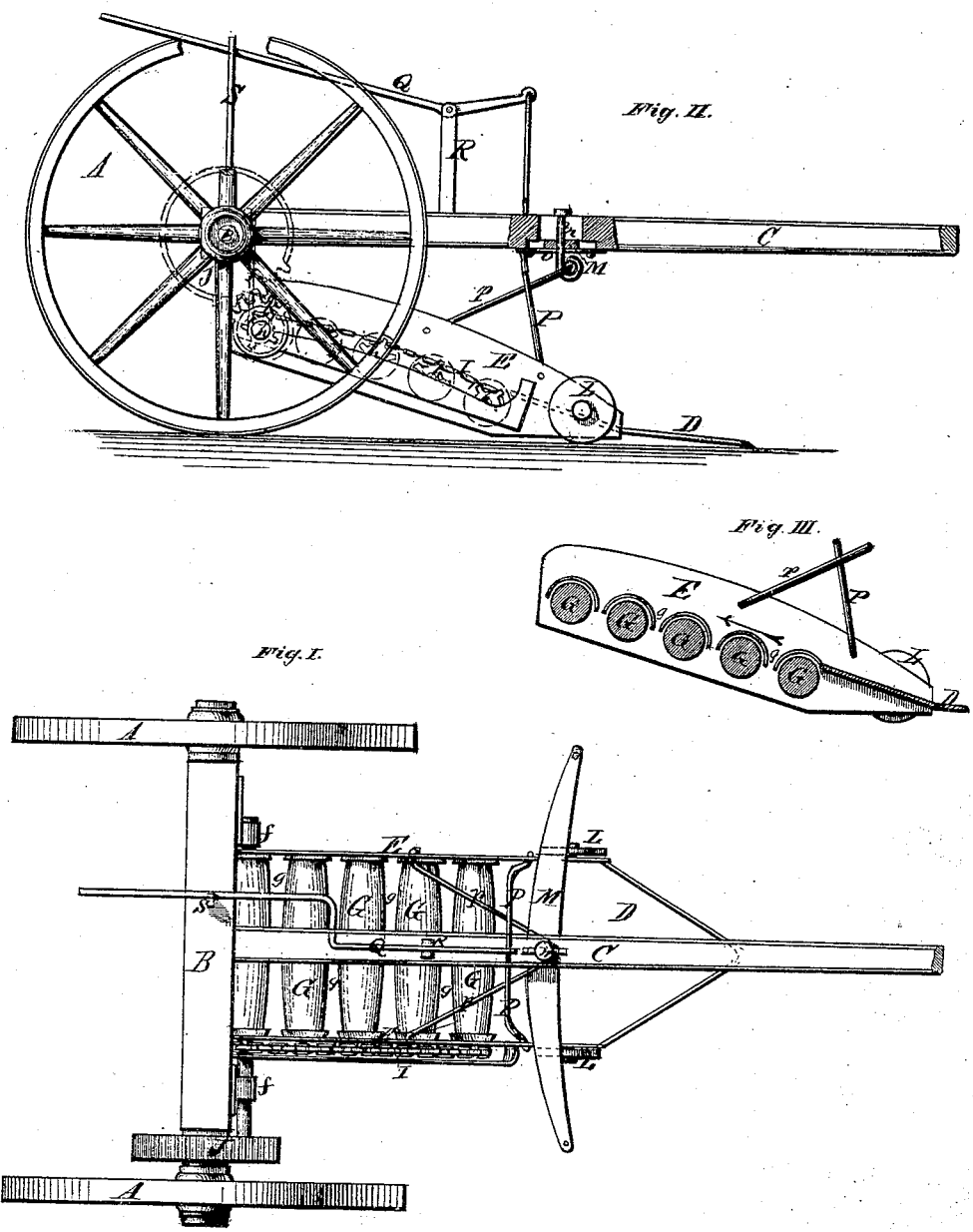

OLIVER PATTERSON, OF SOUTH DANSVILLE, NEW YORK.

IMPROVEMENT IN POTATO-DIGGERS.

Specification forming part of Letters Patent No. 101,499, dated April 5, 1870.

*To all whom it may concern:*

Be it known that I, OLIVER PATTERSON, of South Dansville, in the county of Steuben and State of New York, have invented certain new and useful Improvements in Potato-Diggers, of which the following is a specification.

The invention consists in the arrangement, with a share, of a series of rollers separated a short distance from each other, and rotated by means of rag-wheels and an endless chain or other gearing at the ends thereof, so as to form a dirt-sieve and potato-carrier, the dirt passing between the rollers, while the potatoes are carried backward and deposited at the rear on top of the ground.

In the accompanying drawings, Figure I is a plan, and Fig. II a side elevotion, of my improved machine; Fig. III, a section through the rollers and share.

Like letters of reference designate like parts in each of the figures.

A A represent the wheels, B the axle, and C the tongue, which together form the sulkey.

D is the plow or share, of any suitable construction, for penetrating the earth and elevating the same with the potatoes. This share is secured between the forward ends of two side plates, E E, which are hinged at their rear ends to adjustable arms *f*, pendent from the axle, to which they are attached by bolts passing through slots in the said arms. Arranged between these side plates, E, and having their bearings therein, are the series of rollers G G, separated from each other by a space, *g*, sufficient in width to permit the passage of the dirt, but not the potatoes. The axes of the rollers extend beyond the bearings E at one end, and have mounted thereon rag-wheels *h*, which are connected and driven by an endless chain, I, passing around them. One of the wheels A has attached to the inner end of its hub a spur-wheel, J, that gears with a pinion, *k*, on the extended end of the axis of the rear roller, by which motion is imparted to it, and thence communicated to the other rollers by the rag-wheels and endless chain just described.

L L are guide-wheels at the front ends of the bearings E, designed to run on the ground on each side of the row, and thus aid in regulating the depth at which the share runs, and also serving to diminish the friction on the under side of the share.

M is the whiffletree, arranged underneath the tongue and connected thereto by a guide-pin, *m*, in the tongue, and provided with a nut or other fastening at the top, which permits it to move back and forth in the slot. The whiffletree may be further supported by a strap, *o*, passing under it, bolted to the under side of the tongue. Draft chains or rods *p* connect the whiffletree with the side plates or frame E on each side at or near the center of resistance.

P is a bail attached near the front ends of the plates E, and connecting above the tongue with the short end of a lever, Q, which has its fulcrum in a standard, R, from the tongue. By pressing down on the long arm of this lever the share or plow is raised above the surface of the ground when traveling to and from the field, or in turning around, the lever being retained in place by the long arm thereof engaging with a notched standard, S. This lever also serves to regulate the depth at which the share runs, and to keep it from vertical play. The rollers G, which revolve backward, as indicated by the arrow in Fig. III, receive the earth and potatoes as they are elevated by the share, the earth freely passing down the spaces *g* between the rollers, while the potatoes are carried back and deposited at the rear on top of the ground.

Instead of the endless chain and rag-wheels for actuating the rollers, it is evident the gearing may be substituted therefor, although I prefer the former.

I do not claim, broadly, the combination of the share with rollers; but

What I claim as my invention is—

The arrangement, with the share, of the series of rollers G G, separated by the intervening spaces *g*, and operated by the rag-wheels *h* and endless chain I, or suitable gearing, substantially as hereinbefore set forth.

OLIVER PATTERSON.

Witnesses:
 JAY HYATT,
 JNO. J. BONNER.